US009078052B2

(12) United States Patent
Copner et al.

(10) Patent No.: US 9,078,052 B2
(45) Date of Patent: Jul. 7, 2015

(54) METHOD AND DEVICE FOR CONVERTING AN INPUT LIGHT SIGNAL INTO AN OUTPUT LIGHT SIGNAL

(71) Applicant: UGCS Ltd., Pontypridd, Wales (GB)

(72) Inventors: Nigel J. Copner, Pontypridd (GB); Yongkang Gong, Pontypridd (GB); Wei Loh, Southampton (GB)

(73) Assignee: USW Commercial Services Ltd., Pontypridd (GB)

( * ) Notice: Subject to any disclaimer, the term of this patent is extended or adjusted under 35 U.S.C. 154(b) by 170 days.

(21) Appl. No.: 13/894,334

(22) Filed: May 14, 2013

(65) Prior Publication Data

US 2014/0016933 A1 Jan. 16, 2014

(30) Foreign Application Priority Data

May 14, 2012 (GB) .................................. 1208335.8

(51) Int. Cl.
*H04Q 11/00* (2006.01)
*G02F 2/00* (2006.01)

(52) U.S. Cl.
CPC ............ *H04Q 11/0005* (2013.01); *G02F 2/004* (2013.01); *G02F 2002/006* (2013.01); *G02F 2201/307* (2013.01)

(58) Field of Classification Search
CPC .............. G02F 2/004; G02F 2002/006; G02F 2201/307; H04Q 11/0005
USPC ................................ 359/326–332; 372/21–22
See application file for complete search history.

(56) References Cited

U.S. PATENT DOCUMENTS

| 4,958,892 | A | * | 9/1990 | Jannson et al. | 359/15 |
|---|---|---|---|---|---|
| 5,007,705 | A | * | 4/1991 | Morey et al. | 385/12 |
| 5,815,307 | A | * | 9/1998 | Arbore et al. | 359/328 |
| 5,920,588 | A | | 7/1999 | Watanabe et al. | |
| 6,788,727 | B2 | | 9/2004 | Liu et al. | |
| 6,906,853 | B2 | * | 6/2005 | Gruhlke et al. | 359/332 |
| 6,930,821 | B2 | | 8/2005 | Kurz et al. | |
| 7,123,792 | B1 | * | 10/2006 | Mears et al. | 385/37 |
| 7,173,755 | B2 | * | 2/2007 | Huang et al. | 359/332 |
| 7,483,203 | B2 | | 1/2009 | McKinstrie et al. | |
| 7,492,507 | B1 | * | 2/2009 | Gollier | 359/326 |

(Continued)

FOREIGN PATENT DOCUMENTS

| CN | 1588220 A | 3/2005 |
|---|---|---|
| CN | 101848053 A | 9/2010 |

(Continued)

*Primary Examiner* — Daniel Petkovsek
(74) *Attorney, Agent, or Firm* — EIP US LLP (57) ABSTRACT

A method and device for converting an input light signal into an output light signal, in an optical component is described. An input light signal, at a first wavelength, and a first light beam which may be at a second wavelength, are received at the component. The input light signal and the first light beam interfere in the component to form an interference pattern, which modifies a reflectivity spectrum of the component to increase the reflectivity of the component in a portion of the reflectivity spectrum. A second light beam, having a second wavelength corresponding with a wavelength within the portion of the reflectivity spectrum, is also received at the component and is then reflected from the component, in dependence upon the portion of the reflectivity spectrum, to generate the output light signal at the second wavelength. This enables conversion of light signals to signals at a different wavelength.

13 Claims, 10 Drawing Sheets

(56) References Cited

U.S. PATENT DOCUMENTS

| | | |
|---|---|---|
| 7,764,423 B2 | 7/2010 | McKinstrie et al. |
| 8,331,017 B2 * | 12/2012 | Suchowski et al. ............ 359/326 |
| 8,390,920 B2 * | 3/2013 | Kimura et al. ................ 359/326 |
| 2003/0231686 A1 | 12/2003 | Liu |
| 2006/0092500 A1 | 5/2006 | Melloni et al. |
| 2013/0010351 A1 | 1/2013 | Vermeulen et al. |

FOREIGN PATENT DOCUMENTS

| | | |
|---|---|---|
| CN | 102116992 A | 7/2011 |
| CN | 102508387 A | 6/2012 |
| GB | 2265216 A | 9/1993 |
| JP | 2001059982 A | 3/2001 |
| WO | 2004092819 A | 10/2004 |
| WO | 2004068764 A1 | 12/2004 |

* cited by examiner

METHOD AND DEVICE FOR CONVERTING AN INPUT LIGHT SIGNAL INTO AN OUTPUT LIGHT SIGNAL

CROSS REFERENCE TO RELATED APPLICATION[S]

This application claims the benefit under 35 U.S.C. §119(a) and 37 CFR §1.55 to UK patent application no. GB1208335.8, filed on May 14, 2012, the entire content of which is incorporated herein by reference.

TECHNICAL FIELD

The present invention relates to a method and device for converting an input light signal into an output light signal.

BACKGROUND

Wavelength conversion is used for wavelength routing in photonic network systems such as Wavelength Division Multiplexing (WDM) and Optical Time Division Multiplexing (OTDM). Some of the functions it can perform include reconfigurable routing, contention resolution, wavelength reuse, multicasting, and traffic balancing. Compared with conventional optical-electrical-optical (O/E/O) wavelength conversion schemes, all-optical wavelength conversion (AOWC) is especially attractive because of the potential advantages of high speed, compactness, lower-power consumption, and high integration. Increasing demands on global delivery of high-performance network-based applications, such as cloud computing and (ultra) high definition video-on-demand streaming, requires optical networks with higher capacity and more powerful signal processing capability. This, in turn, requires wavelength conversion techniques with a broad conversion wavelength tuning range that can be used with a wide range of modulation formats.

Existing AOWC techniques can be mainly classified into two categories: optical gating and coherent mixing. Optical gating wavelength conversion techniques, such as cross gain modulation (XGM) and cross phase modulation (XPM), exploit carrier depletion and/or carrier density-induced refractive index changes so that only intensity-modulated input signals can be converted. Coherent mixing wavelength conversion techniques, such as difference frequency generation (DFG) and four wave mixing (FWM) utilize the photon conversion function in second- or third-order non-linear materials, which requires phase matching for efficient conversion. FWM-based wavelength conversion has been investigated widely in recent years in different structures, such as fibres, silicon waveguides, and semiconductor optical amplifiers, and is commonly thought of as one of the most promising AOWC techniques because of its ability to support operation using any data format. However, because FWM requires phase-matching, it suffers from poor conversion wavelength tunability.

It is desirable to provide wavelength conversion with increased tunability.

SUMMARY

According to a first aspect of the present invention, there is provided a method of converting an input light signal into an output light signal using an optical component that has a refractive index that has a spatial periodicity that determines a reflectivity spectrum of the component, the method comprising:

receiving at the component the input light signal, wherein the input light signal has a first wavelength;

receiving at the component a first light beam so that the input light signal and the first light beam interfere in the component to form an interference pattern, wherein the reflectivity spectrum of the component is modified in dependence upon the interference pattern to increase the reflectivity of the component in a portion of the reflectivity spectrum;

receiving at the component a second light beam, wherein the second light beam has a second wavelength corresponding with a wavelength within the portion of the reflectivity spectrum; and reflecting from the component, in dependence upon the portion of the reflectivity spectrum, the second light beam to generate the output light signal, wherein the output light signal has the second wavelength.

According to a second aspect of the present invention, there is provided a device for converting an input light signal into an output light signal, the device comprising an optical component, said component having a refractive index having a spatial periodicity that determines a reflectivity spectrum of the component, wherein the optical component is arranged to:
receive an input light signal having a first wavelength;
receive a first light beam, such that the first light signal and the first light beam interfere to form an interference pattern such that the reflectivity spectrum of the component is modified in dependence upon the interference pattern to increase the reflectivity of the component in a portion of the reflectivity spectrum;
receive a second light beam, the second light beam having a second wavelength corresponding with a wavelength within the portion of the reflectivity spectrum; and
reflect, from the optical component, in dependence upon the portion of the reflectivity spectrum, the second light beam to generate the output light signal, wherein the second light signal has the second wavelength.

Features and advantages of the invention will become apparent from the following description of preferred embodiments of the invention, given by way of example only, which is made with reference to the accompanying drawings.

DETAILED DESCRIPTION

Figure 1:
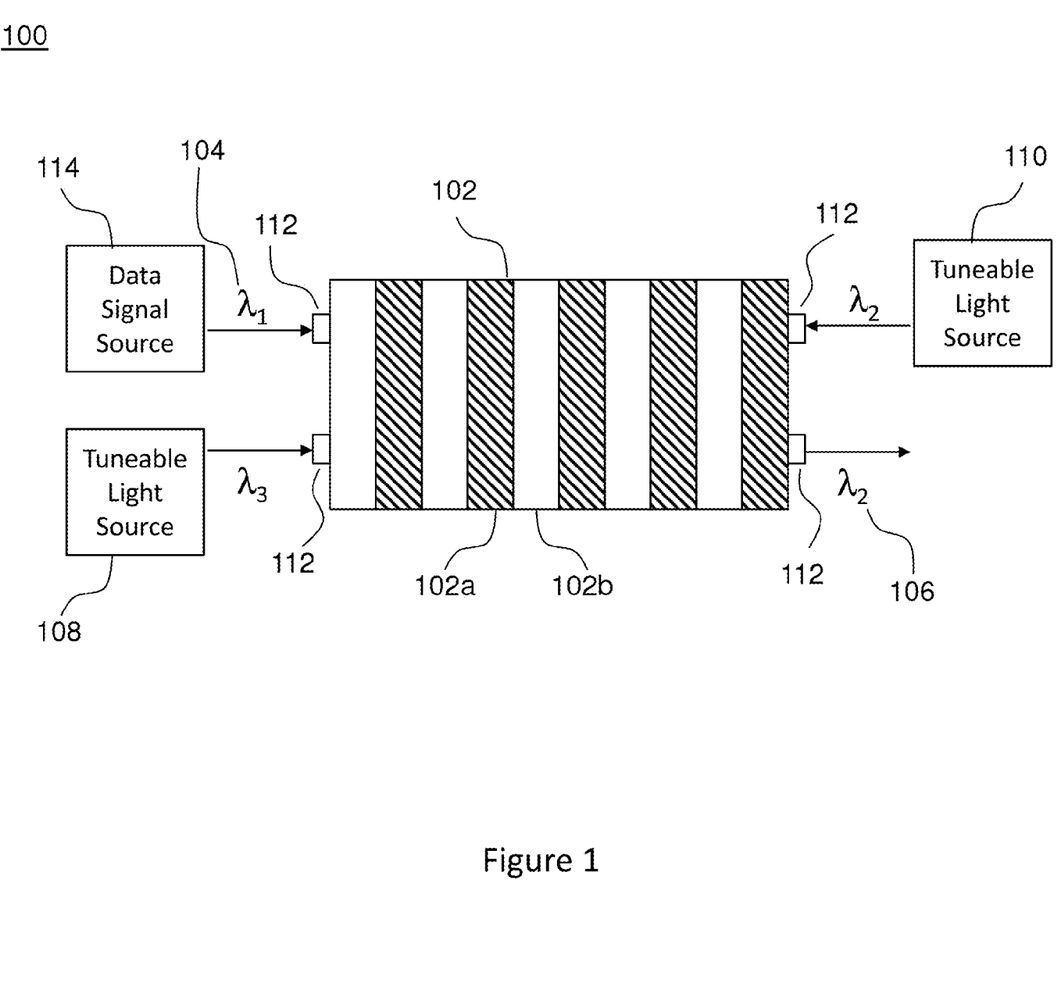
FIG. 1 is a schematic diagram of an all-optical wavelength converter according to an embodiment.

A method of performing all-optical wavelength conversion (AOWC) is described with reference to FIG. 1, which is a schematic diagram showing a device for performing all-optical wavelength conversion, hereinafter referred to as a converter 100. It will be understood that the terms optical and light, as used throughout the following description, refer to electromagnetic radiation of any wavelength.

The converter 100 comprises an optical component, which may be a Bragg grating 102 for example, that is arranged to receive an input optical signal 104 at a first wavelength, $\lambda_1$, and is arranged to output an output optical signal 106 at a second, different, wavelength, $\lambda_2$. The wavelength, $\lambda_2$, of the output optical signal 106 is the wavelength to which the wavelength of the input signal 104 is to be converted.

The input optical signal 104 is received from one side of the Bragg grating 102 and the output optical signal 106 is output from a second side of the Bragg grating, opposite the first side.

The Bragg grating is also arranged to receive optical inputs from two independently tuneable light sources, such as tuneable laser sources, which may provide beams of light to the Bragg grating 102. A first tuneable light source, referred to hereinafter as a pump source 108, is received on the first side of the Bragg grating 102 and a second tuneable light source, referred to hereinafter as a probe source 110, is received on the second side of the Bragg grating 102. The probe source 110 is tuned to the wavelength, $\lambda_2$, of the output signal 106, while the pump source 108 is tuned to a third wavelength, $\lambda_3$. Typically, the probe source 110 is more intense than the input signal 104.

In operation, the converter 100 receives the input optical signal 104 and the light from the tuneable pump source 108. As described in detail below, interference between the input optical signal 104 and the light from the tuneable pump source 108 causes a modification of the so-called photonic band gap properties of the Bragg grating 102 such that ultra-narrow additional reflective peaks occur at least at the wavelength, $\lambda_2$, to which the input signal 104 is to be converted. The additional reflective peak at the wavelength, $\lambda_2$, reflects light from the tuneable probe source 110 (which is tuned to $\lambda_2$). Where the input signal 104 is encoded with data by amplitude modulation, the reflectivity of the additional reflective peaks are also modulated such that the reflected light tracks the intensity pattern of the input optical signal 104, thereby forming an output optical signal 106 encoded with the same data as the input signal 104 but at a different wavelength. Similarly, where the input signal 104 is encoded with data by phase modulation, the phase of the additional reflective peaks are also modulated such that the reflected light tracks the phase pattern of the input optical signal 104, thereby forming an output optical signal 106 encoded with the same data as the input signal 104 but at a different wavelength.

In some embodiments, the converter 100 may comprise optical couplings 112, such as fibre couplings, arranged to couple one or more optical fibres to the grating 102. For example, one or more of the input optical signal 104, the light from the pump source 108, the light from the probe source 110, and an optical path for carrying the output optical signal 106 may be coupled to the Bragg grating 102 via the optical couplings 112. It will be understood that although, in FIG. 1, the input optical signal 104, the light from the pump source 108, the light from the probe source 110, and an optical path for carrying the output optical signal 106 are coupled to the Bragg grating via separate coupler, the function of the couplers 112 may be combined. For example, the input signal 104 and the light from the pump source 108 may be combined in a coupler 112, such as a Y-coupler, prior to being directed, as a combined beam, into the Bragg grating 102. Similarly, the light from the probe source 110 may be received by one arm of a Y-coupler and directed in a beam toward the Bragg grating 102. The output signal 108 may then be reflected from the Bragg grating 102 to the same Y- splitter along the same path that the probe source 110 followed to the Bragg grating 102.

In some embodiments, the converter 100 may include the pump source 108 and the probe source 110, and may be arranged to receive the input optical signal 104 from a separate data signal source 114. In such a device, the converter 100 may be arranged to receive the input signal 104 as described above, and to convert the received input signal to generate an output signal 106 having a different wavelength. For example, the pump and probe sources 108, 110 may be formed with the Bragg grating 102 in an integrated device that has an input for receiving the input optical signal 104, and an output for transmitting the output signal 106. Alternatively, one or more of the input optical signal 104, the pump source 108, the probe source 110, and the path for the output signal 106 may be separate from the Bragg grating 102 and aligned with the Bragg grating 102 in use.

The converter 100 may also include any necessary control electronics for controlling or tuning the wavelength of the pump and/or probe sources 108, 110. The converter 100 may also include additional control elements for controlling other properties of the Bragg grating 102. For example, the converter 100 may include thermoelectric components for controlling the temperature of the Bragg grating 102 and or piezoelectric components for controlling a strain applied to the Bragg grating 102.

Principles Underpinning the Operation of the Converter

The Bragg grating 102 may be formed from a stack comprising multiple layers 102a, 102b of third-order Kerr non-linear materials, such as silicon or other semiconductor materials. The refractive index of the third order Kerr non-linear material changes in response to an applied electromagnetic field; in particular, the refractive index of the material increases with the intensity of electromagnetic radiation present at a given point in the material.

The layers of non-linear material are arranged such that the refractive index of the grating varies periodically (in space) in one dimension. For example, in FIG. 1, the crosshatched layers 102a represent layers having a relatively low refractive index and the un-hatched layers 102b represent layers having a relatively high refractive index.

When light is incident on the resulting stacked Bragg grating 102, reflections occur at each of the interfaces between the low 102a and high refractive index layers 102b. The periodicity of the Bragg grating 102 gives rise to a photonic band structure analogous to the electronic band structure in semiconductor materials. Photons with frequencies within an incidence angle-dependent band gap cannot propagate through the Bragg grating 102. This is caused by destructive interference of waves scattered from the interfaces between the low and high refractive index layers 102a, 102b, which results in complete or nearly complete reflection of photons having a range of energies.

The reflectance or transmittance of the Bragg grating 102 is dependent on the thickness of the layers 102a, 102b of the grating 102, the refractive indices of each of the layers 102a, 102b of the grating 102, and the wavelength and angle of incidence of incident light. The dimensions of the layers 102a, 102b that make up the Bragg grating 102 may be determined by satisfying the well-known Bragg condition for coherent reflection, $$2a \cos \theta = mn\lambda$$

where a is the physical extent (referred to hereinafter as the period) of a unit cell comprising one low refractive index layer 102a and one high refractive index layer 102b, $\theta$ is the angle of incidence, n is the spatially averaged refractive index of the unit cell, $\lambda$, is the wavelength of incident light and m, an integer value, is the order of the grating. The simplest solution to satisfy the Bragg condition is to build up a structure from elements having a thickness that is one quarter of the wavelength of light that is to be reflected in that material. However, more generally, the Bragg condition is satisfied when the period of the Bragg grating is $$a = \frac{m\lambda}{2n_{eff}}$$

where $n_{eff}$ is the effective refractive index of the unit cell. Satisfying the Bragg condition leads to the formation of a photonic band gap. Light at frequencies within the band gap may be entirely reflected (depending on the number of periods and the refractive index contrast between the layers). Light at frequencies outside the band gap is, at least partially, transmitted.

As described above, the Bragg grating 102 is arranged to receive, at the first side of the grating 102, an input optical signal 104 and light from the pump source 108. The converter 100 is arranged such that, in use, the input optical signal 104 and the light from the pump source 108, which typically have the same polarisation, interfere to form an interference pattern. A difference between the wavelength, $\lambda_1$, of the input signal 104 and the wavelength, $\lambda_3$, of the pump source 108 light causes beating in the interference pattern. The beating results in a spatial light intensity profile, I(z), which has a corresponding effect on the refractive index of the Bragg grating (which as described above may be made from third order Kerr non-linear material). This results in a perturbation of the refractive index profile of the Bragg grating 102 that is dependent on the input signal 104 and the light from the pump source 108, as described below.

Due to the non-linearity of the Bragg grating 102, the beating intensity profile I(z) induces a refractive index of $\Delta n(z)=n_2 I(z)$, where $n_2$ is the nonlinear refractive index of the nonlinear Bragg grating 102; the value of $n_2$ is typically small and may be, for example, $4\times10^{-14}$ cm$^2$/W. For ease of explanation, we can assume that the Bragg grating does not cause any reflection of the input signal 104 or the light from the pump source 108. In this case the beating intensity profile is given by $$I(z)=I_1+I_2+2\sqrt{I_1 I_2}\cos((k_1-k_2)z+\phi)I,$$

where $I_1$ and $k_1$ are the incident light intensity and wave vector of the light from the pump source 108, $I_2$ and $k_2$ are the incident light intensity and wave vector of the input signal 104, and $\phi$ is a phase difference between the input signal 104 and the light from the pump source 108. The refractive index profile (in this simplified case) has a cosine function profile with a spatial period of $\Lambda=2\pi/(K_1-K_2)$. In this simplified example, when the incident light intensity $I_1$ and $I_2$ are both equal to $0.7\times10^{-3}/(4n_2)$, the induced refractive index change is $\Delta n(z)=0.7\times10^{-3} \cos^2((k_1-k_2)z/2+\phi/2)$, which yields a maximum value of $0.7\times10^{-3}$. However, since in reality reflection occurs at each interface between the two different material layers of the Bragg grating 102, the induced refractive index change $\Delta n(z)$ is not exactly sinusoidal. This reduces the actual maximum value of $\Delta n(z)$ somewhat as described below; for example, the actual maximum value of $\Delta n(z)$ may be about $0.6\times10^{-3}$.

Figure 2A:
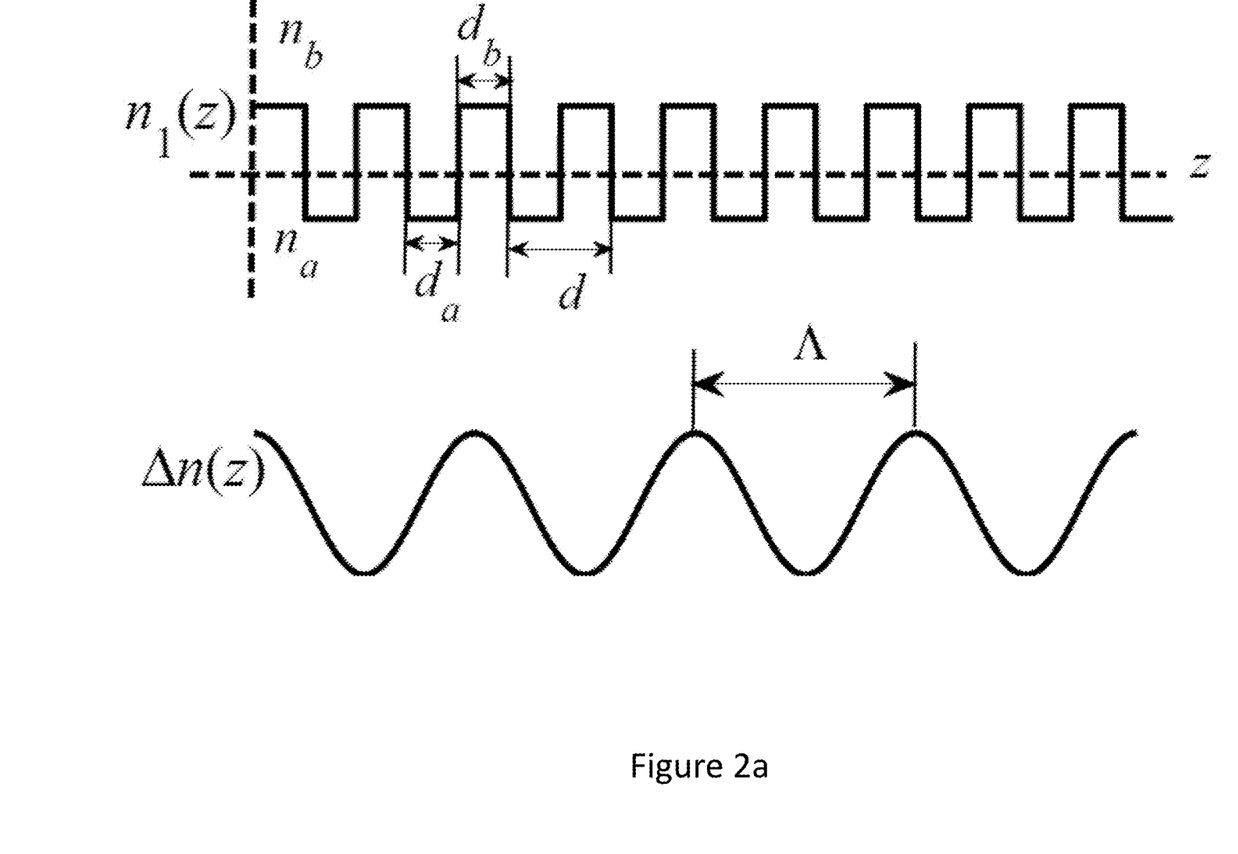
FIG. 2a is a diagram showing the refractive index profile, $n_1(z)$, of a non-linear Bragg grating suitable for use in an all-optical wavelength converter, and an idealised perturbation, $\Delta n(z)$, to the refractive index profile of the Bragg grating.

FIG. 2a is a schematic diagram showing the refractive index profile, $n_1(z)$, of the Bragg grating 102, and a perturbation, $\Delta n(z)$, to the refractive index profile of the Bragg grating 102. The refractive indices of the low and high refractive index layers 102a, 102b are labelled $n_a$ and $n_b$ respectively, and these layers have thickness $d_a$ and $d_b$ respectively. The physical extent of the unit cell (that is, one period of the Bragg grating 102), $d=d_a+d_b$.

The perturbation $\Delta n(z)=n_c+n_d \cos(2\pi z/\Lambda+\phi)$ is a refractive index change with cosine function profile, where $n_c$ and $n_d$ represent the refractive index of the layer of the Bragg grating 102 and the maximum perturbation of the refractive index respectively, $\Lambda$ is the period of the perturbation, $\Delta n(z)$, of the refractive index profile and $\phi$ is phase. In the presence of the perturbation, the perturbed refractive index profile of the Bragg grating 102 is $n(z)=n_1(z)+\Delta n(z)$. As is explained in detail below, the effect of the perturbation of the refractive index profile of the Bragg grating 102 is to introduce additional reflective peaks in the reflectivity spectrum of the Bragg grating 102.

The additional reflective peaks may be formed by increasing the reflectivity of the component in portions of the reflectivity spectrum of the component where, in the absence of the interference pattern, the reflectivity of the component is zero or very low. Alternatively, the additional reflective peaks may enhance partially reflective portions of the reflectivity spectrum of the component. It will be understood that the peaks may have any wavelength bandwidth and are not limited to narrow or ultra-narrow peaks.

Figure 2B:
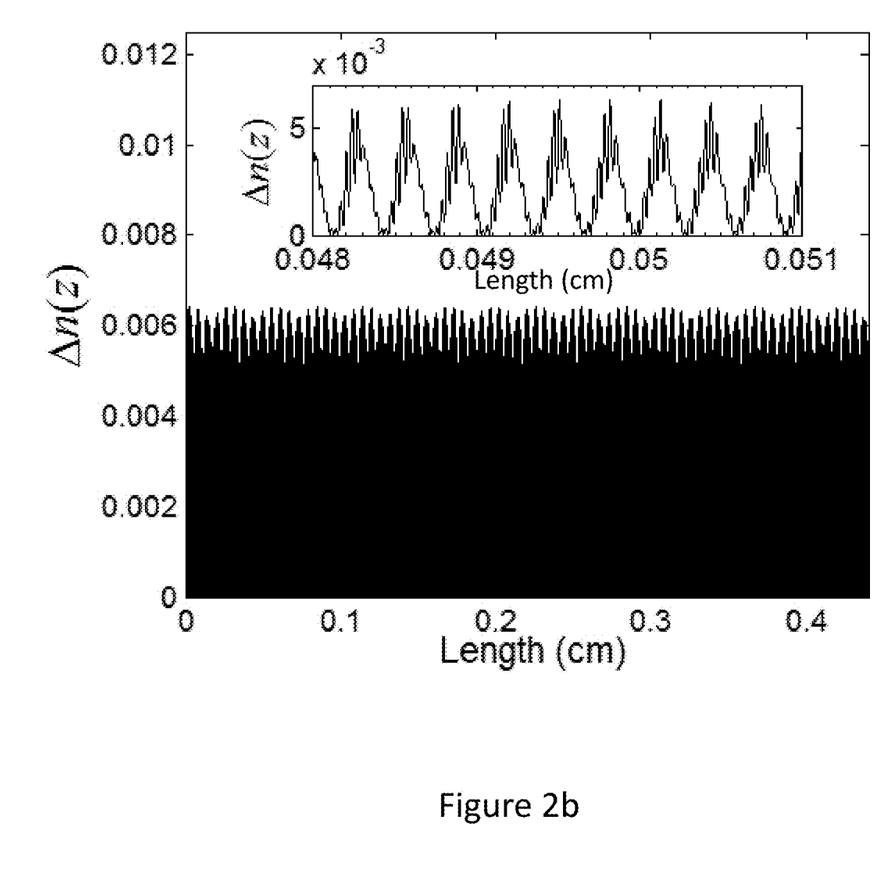
FIG. 2b is a diagram showing a representation of a perturbation, $\Delta n(z)$, to the refractive index profile, suitable for inducing a change in the reflectivity spectrum of a non-linear Bragg grating.

FIG. 2b shows the perturbation, $\Delta n(z)$, to the refractive index profile of the Bragg grating 102 taking into account the effect of reflections of the input optical signal 104 and the light from the pump source 108. As can be seen in FIG. 2b, the actual perturbation, $\Delta n(z)$, to the refractive index profile of the Bragg grating 102 is not sinusoidal (not exactly a cosine function) and the form of the perturbation includes many ripples overlaying the ideal periodic perturbation. As described above this results in a slight reduction in the perturbation to the refractive index.

In order to investigate the photonic band gap properties of the Bragg grating 102 in the presence of an induced refractive index change $\Delta n(z)$, a transmission matrix model may be employed. Assuming $\Lambda/d$ to be integer (that is, the period of the beating perturbation of the refractive index is an integer multiple of the period of the non-linear Bragg grating 102) to ensure that n(z) is periodic such that the photonic dispersion theory can be applied, and dividing the length of each unit cell of the n(z) structure into Q sections, the transmission matrixes for single a period yields $$M = \prod_{j=1}^{Q} \begin{pmatrix} \cos\delta_j & \dfrac{i\sin(\delta_j)}{\gamma_j} \\ i\gamma_j\sin(\delta_j) & \cos(\delta_j) \end{pmatrix},$$

where $\delta_j=(2\pi/\lambda)n_j\Delta z$, $\gamma_j=n_j(\epsilon_0\mu_0)^{0.5}$, $\Delta z=\Lambda/Q$, $n_j=\Delta n(j\Delta z)$. Q is an integer, $\lambda$ is the optical wavelength of incident light, and $\epsilon_0$ and $\mu_0$ are the permittivity and permeability of light travelling in vacuum, respectively. Therefore, the dispersion equation for optical modes in the n(z) structure can be written as $$\cos K\Lambda = \frac{M_{11} + M_{22}}{2}.$$

where, K is the Bloch-wave vector, and $M_{11}$ and $M_{22}$ are diagonal elements of the matrix M.

Figure 3A:
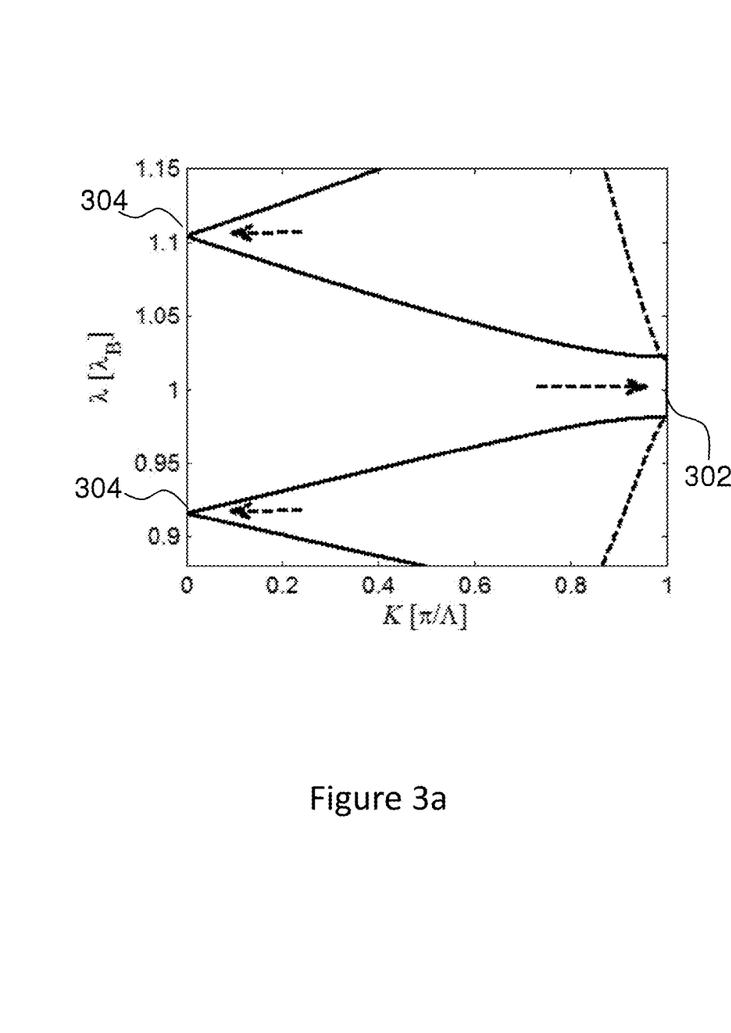
FIG. 3a is a dispersion diagram for an all-optical wavelength converter.
Figure 3B:
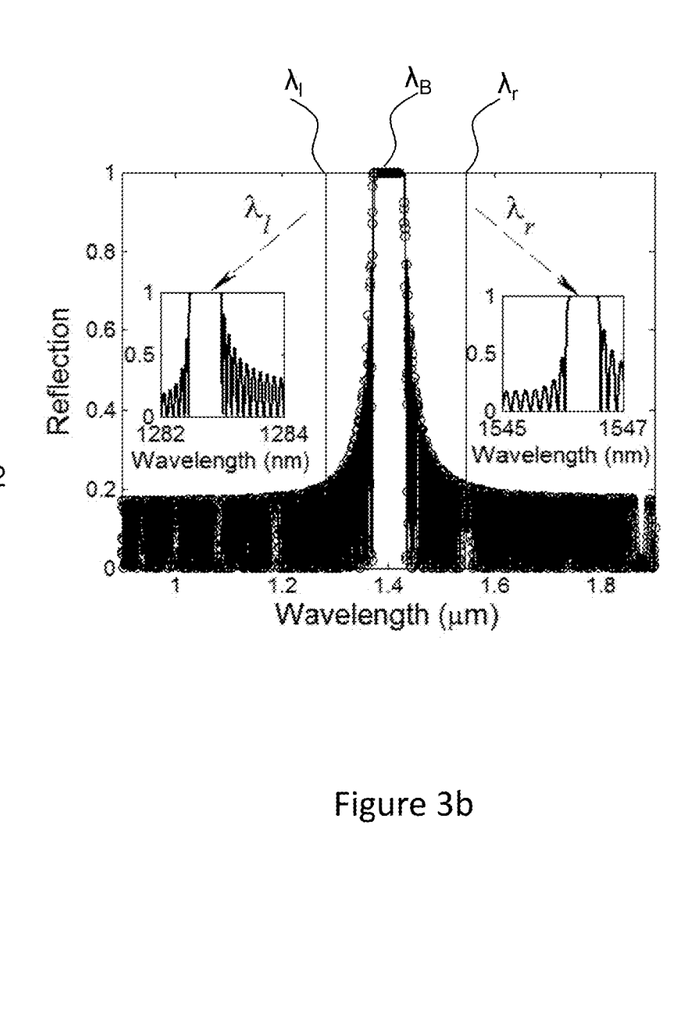
FIG. 3b is a reflectivity spectrum for an all-optical wavelength converter.

FIGS. 3a and 3b are a dispersion diagram and a reflectivity spectrum of a Bragg grating 102 in the presence of the input data signal 104 and light from the pump source 108, with the correspondingly perturbed refractive index profile. As can be seen from FIGS. 3a and 3b, in the presence of the perturbed refractive index profile, additional band gaps 302 are induced in the dispersion diagram and corresponding additional reflective peaks (ARPs) are induced in the reflectivity spectrum of the Bragg grating 102. The ARPs are formed at wavelengths below ($\lambda_1$) and above ($\lambda_r$) the wavelength of the band gap ($\lambda_B$) of the unperturbed Bragg grating 102. The wavelengths at which the ARPs are induced is dependent on the wavelength, $\lambda_1$, of the input data signal 104 and the wavelength, $\lambda_3$, of the light received from the pump source 108. Therefore, the wavelengths at which ARPs appear can be tuned by tuning either the input data signal, $\lambda_1$, or the pump source, $\lambda_3$.

In some embodiments, additional tuning of the ARPs may be achieved by tuning the unperturbed band gap of the Bragg grating 102. For example, the period d of the Bragg grating may be varied (by changing the temperature of the Bragg grating 102 or by applying strain to the Bragg grating 102, for example) which in turn causes a change in the wavelength at which the band gap of the Bragg grating 102 occurs. This in turn causes the wavelengths at which the ARPs occur to change. This enables wavelength tuning or shifting over a wide range of wavelengths in comparison with existing methods of all optical wavelength conversion, such as four-wave mixing.

When light from the probe source 110 operating at a wavelength equal to that of one of the additional reflective peaks (that is, $\lambda_2$ is equal to $\lambda_1$ or $\lambda_r$) is incident on the Bragg grating it is reflected in dependence upon the portion of the reflectivity spectrum where the peak is present. Where the input signal 104 is encoded with data by amplitude modulation, the reflectivity of the additional reflective peaks are also modulated such that the reflected light tracks the intensity pattern of the input optical signal 104, thereby forming an output optical signal 106 encoded with the same data as the input signal 104 but at a different wavelength, $\lambda_2$. Similarly, where the input signal 104 is encoded with data by phase modulation, the phase of the additional reflective peaks are also modulated such that the reflected light tracks the phase pattern of the input optical signal 104, thereby forming an output optical signal 106 encoded with the same data as the input signal 104 but at a different wavelength, $\lambda_2$.

Typically, the light from the probe source 110 is received at the second side of the Bragg grating 102, such that it is counter-propagated with respect to the input signal 104 and the light from the pump source 108. The polarization of the light received from the probe source 110 may be perpendicular to the polarization of the input signal 104 and the light from the pump source 108, so that the probe source 110 does not interfere with the input signal 104 or the light from the pump source 108.

We now describe, with reference to dispersion data (calculated using the dispersion equation described above) and reflectivity data (derived from the transmission matrix model described above), various properties of the converter 100 by way of the following examples.

EXAMPLE 1

FIGS. 3a and 3b show a dispersion diagram and a reflectivity spectrum for a Bragg grating 102 arranged to have a band gap centred at a Bragg wavelength, $\lambda_B$=1400 nm. The low refractive index portions 102a have a refractive index $n_a$=1.5, and a thickness $d_a=\lambda_B/(4n_a)$. The high refractive index portions 102b have a refractive index $n_b$=1.6, and a thickness $d_b=\lambda_B/(4n_b)$. As can be seen, this Bragg grating structure exhibits high reflectivity over a wavelength band centred around 1400 nm. The parameters for the perturbation of the refractive index are $n_c=n_d=5\times10^{-3}$, $\phi=0$, and $\kappa=11d$.

FIG. 3a shows dispersion diagrams for the perturbed Bragg grating 102 (whose refractive index profile is $n_1(z)+\Delta n(z)$) in both the perturbed (solid lines) and unperturbed (dashed lines) states. Photonic band gaps can appear either at the centre or the border of the Brillouin zone; that is, at either K=0 or K=1. As shown in FIG. 3a, the unperturbed Bragg grating 102 has a band gap 302 at K=1 with central wavelength of $\lambda_B$. While $\Delta n(z)$ is superimposed onto the refractive index profile of the Bragg grating 102, new dual ARPs 304 are created at K=0; these are located at wavelengths above ($\lambda_r$) and below ($\lambda_1$) (that is, at either side of) the wavelength $\lambda_B$ of band gap of the Bragg grating, with wavelengths of $0.916\lambda_B$ and $1.1046\lambda_B$, respectively. It should be noted that, as used herein, the term peak does not imply a precise wavelength. It will be understood that the ARPs have a finite width and may not necessarily be perfectly reflecting.

FIG. 3b shows a reflectivity spectrum for a Bragg grating with N=10,000 periods. As expected, two ARPs occur at either side of the main Bragg grating 102 reflective peak (that is, at wavelengths above and below $\lambda_B$). The centre wavelengths of these additional reflective peaks are $\lambda_1$=1282.4 nm and $\lambda_r$=1546.5 nm, respectively.

EXAMPLE 2

Figure 4:
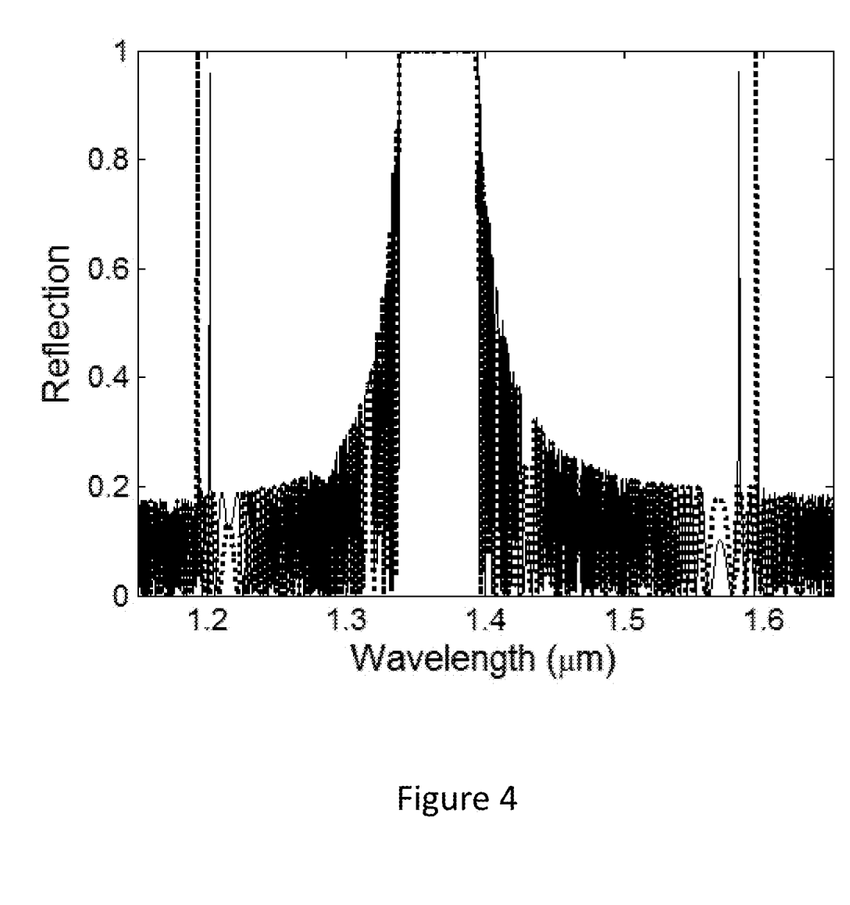
FIG. 4 is a reflectivity spectrum for an all-optical wavelength converter.

FIG. 4 shows a reflectivity spectrum calculated using the following parameters: $n_a$=1.5, $n_b$=1.6, $d_a$=220 nm, $d_b$=220 nm, N=10,000, $n_2=4\times10^{-14}$ cm$^2$/W, $\lambda_1$=1200 nm, and $\lambda_3$=960 nm. When the light from the pump source 108 and the input signal 104 light enters the nonlinear Bragg grating 102, they interfere and yield a beating intensity profile I(z) as described above.

To investigate the effect of the actual induced refractive index change Δn(z) (such as the non-ideal beating pattern shown in FIG. 2a), it is instructive to consider two cases for the Kerr non-linear Bragg grating 102. The first case is that both of the two materials in Bragg grating 102 have Kerr non-linearity. This kind of Bragg grating corresponds to a surface relief grating which is fabricated by etching an air grating on the surface of a bulk non-linear material. In this case, as a result, the perturbed refractive index of the Brag grating 102 is n(z)=n$_1$(z)+Δn(z). In the second case, only a single material in the Bragg grating has Kerr non-linearity. This kind of grating corresponds to grating formed using coating techniques to coat two different material layers alternatively to fabricate the Bragg grating. In this case, assuming the first material in BG has Kerr nonlinearity, refractive index of the perturbed Bragg grating becomes:

$$n(z) = \begin{cases} n_1(z) + \Delta n(z), & m(d_a + d_b) < z < m(d_a + d_b) + d_a \\ n_1(z), & m(d_a + d_b) + d_b < z < (m+1)(d_a + d_b) \end{cases}$$

where m is an integer representing the m$^{th}$ unit cell of the Bragg grating 102. FIG. 4 shows the reflection spectra for these two cases (using the conditions described above). For both cases, ARPs are observed at the either side of the stop-band (band gap) of the Bragg grating 102, even though the Kerr induced refractive index Δn(z) is not exactly a cosine function.

EXAMPLE 3

Effect of Pump Wavelength

Figure 5A:
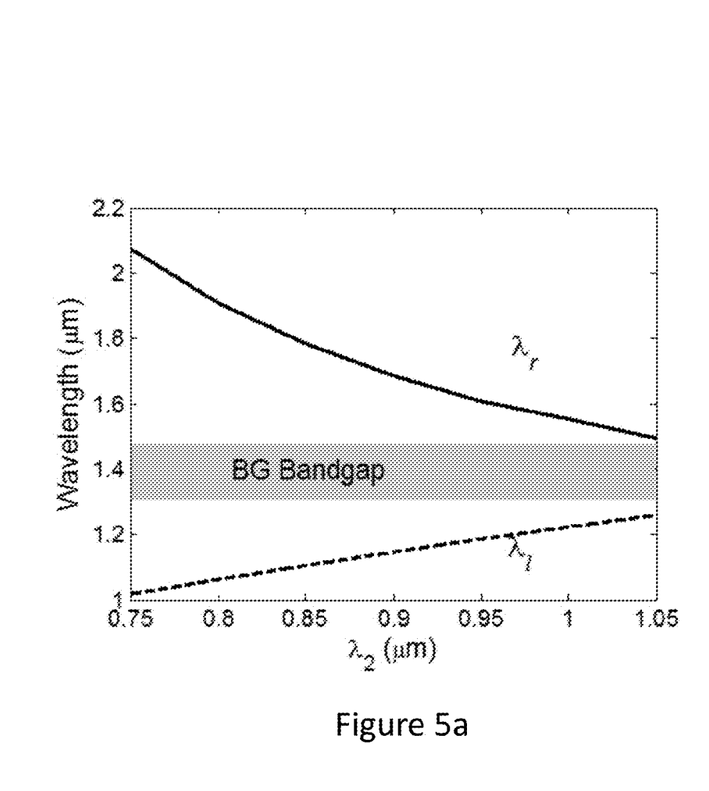
FIG. 5a is a plot showing how the centre wavelengths of additional reflective peaks in an all-optical wavelength converter vary with the wavelength of a pump source.
Figure 5B:
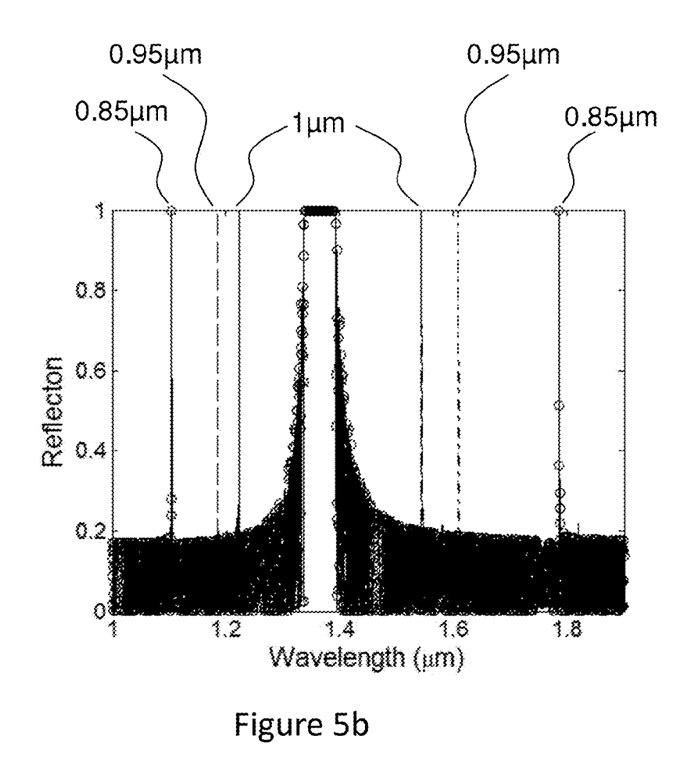
FIG. 5b is a plot showing how reflectivity spectrum of an all-optical wavelength converter varies with the wavelength of a pump source.

FIG. 5a shows how the wavelength of the dual ARPs varies with the wavelength, λ$_3$, of the pump source 108 when the wavelength of the input signal light 104, λ$_1$=1200 nm. FIG. 5b shows reflection spectra for the perturbed Bragg grating when the wavelength of the pump source 108 is respectively 0.85 μm, 0.95 μm, and 1 μm. All other parameters are the same as those described with reference to Example 2.

It is noted that by changing the wavelength difference between the input signal 104 and the light from the pump source 108, the induced refractive index Δn(z) periodic can be varied, which thereby enable flexible tuning of the wavelengths of the ARPs outside of the band gap of the Bragg grating 102. It is observed that by changing λ$_3$ from 1050 nm to 750 nm, the ARPs can be efficiently generated within the wavelength range of 1495 nm to 2076 nm In addition, varying the period, d, of the unperturbed Bragg grating (by changing the applied temperature or strain) changes the band gap of the Bragg grating 102 so as to tune provide additional tuning of the wavelengths of the ARPs. Therefore, the induced ARPs can be tuned to almost any wavelength, which enables wavelength conversion or shifting over a wide range of wavelengths in comparison with other methods of all-optical wavelength conversion, such as four-wave mixing.

EXAMPLE 4

Effect of Phase

Figure 6A:
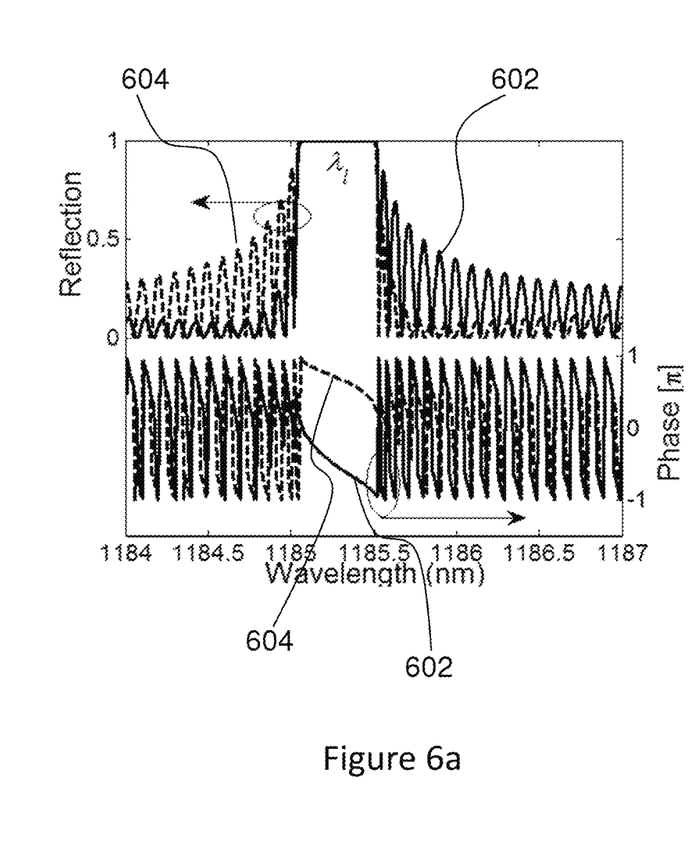
FIG. 6a is a plot showing reflectivity and phase spectra for an additional reflective peak generated in an all-optical wavelength converter.
Figure 6B:
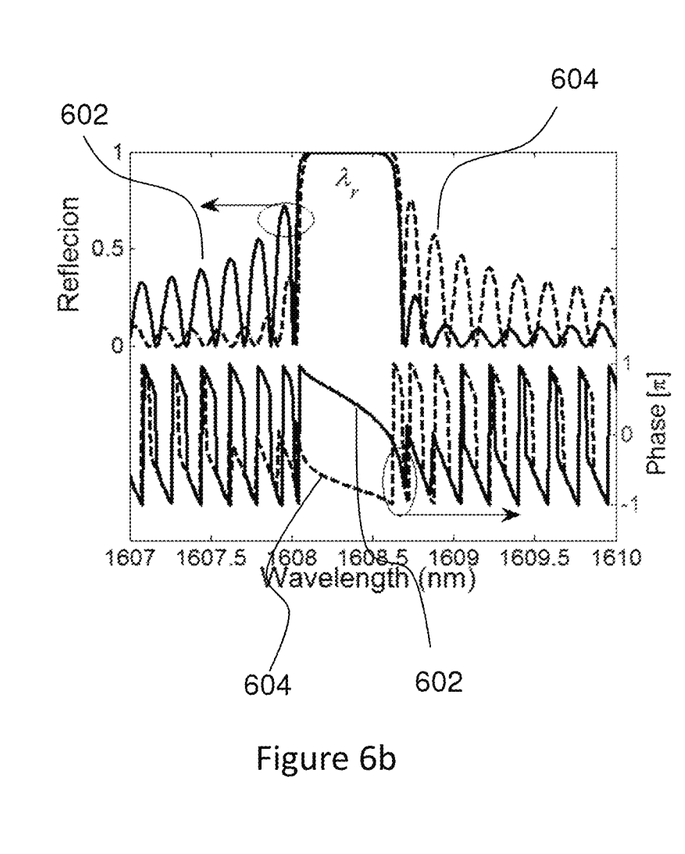
FIG. 6b is a plot showing reflectivity and phase spectra for an additional reflective peak generated in an all-optical wavelength converter.

FIG. 6a shows plots of the reflection and phase spectra for the left (lower wavelength) ARP and FIG. 6b shows plots of the reflection and phase spectra for the right (higher wavelength) ARP, when λ$_1$=1200 nm and λ$_2$=950 nm. The spectra are plotted for phase differences φ between the light from the pump source 108 and the input signal 104 of −π/2 602 and π/2 604. The ARPs have an inherent phase, which corresponds with a phase shift that is imparted to light that is reflected from the ARPs. The phase of the ARPs arises from the beating intensity profile generated by the input signal 104 and light from the pump source 108. When the phase difference between the input signal 104 and the light from the pump source 108 is changed (for example, as the input signal 104 is phase-modulated), the beating intensity profile is changed, which causes the phase of the ARPs that is imparted to reflected light to change.

As can be seen, if the φ phase of the input signal 104 is changed (for example, during phase modulation in DPSK and coherent systems) φ is changed and thus the inherent phase of the ARPs is varied but the band gaps of the ARPs remain substantially constant. In other words, when the input signal 104 is phase-modulated, the phase of the input signal 104 is transferred to the output signal 106 without changing its intensity. Therefore, in contrast to XGM and XPM converters that only allow intensity modulated input signals, and FWM that allows phase and intensity modulated input signals but only when the phase-match condition is satisfied, the all-optical wavelength conversion method described herein is format-transparent without requiring phase-matching; this enables conversion over a broad range of wavelengths.

EXAMPLE 5

In this example, the refractive indices of the two materials in the Bragg grating are n$_a$=1.5 and n$_b$=1.6, respectively, and the their lengths in each period are d$_a$=d$_b$=220 nm. The Bragg wavelength is therefore λ$_B$=2(n$_a$d$_a$+n$_b$d$_b$)=1364 nm and the grating period is d=d$_a$+d$_b$=440 nm. For the refractive index modulation Δn(z) used to perturb the refractive index of the Bragg grating 102, n$_c$=n$_d$=2.5×10$^{-3}$, Λ=11d, and φ=0.

Figure 7A:
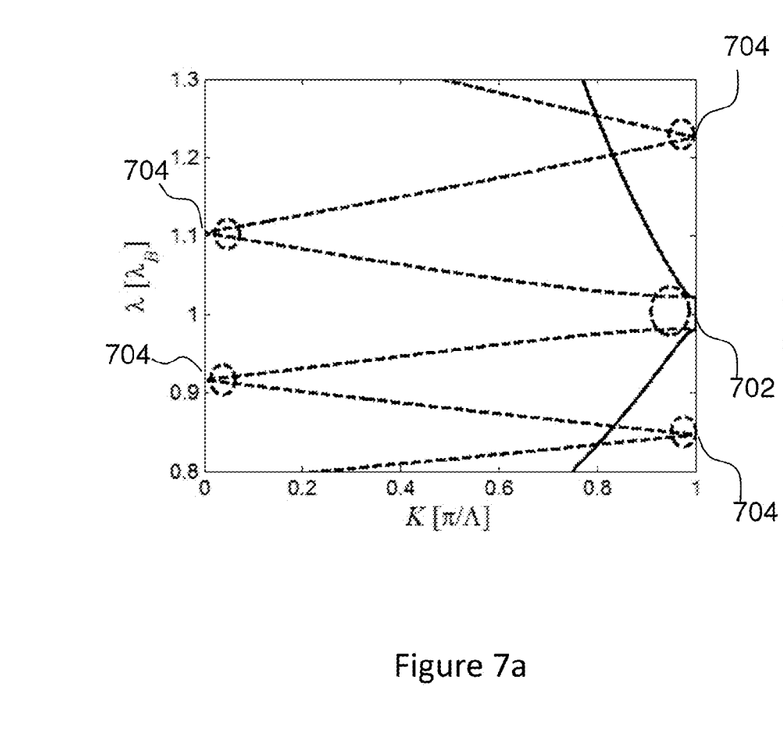
FIG. 7a is a dispersion diagram for an all-optical wavelength converter.

FIG. 7a shows dispersion diagrams both for the perturbed (dashed lines) and unperturbed (solid lines) Bragg gratings 102 calculated using the dispersion equation described above with the above parameters. As explained above, in photonic crystals, band gaps appear either at the centre or at the border of the Brillouin zone, i.e., at either K=0 or K=1. We note from FIG. 7a that the unperturbed Bragg grating has a band gap 702 at K=1 with central wavelength of λ$_B$. While the Δn(z) is superimposed onto it, multiple ARPs 704 are created and located at wavelengths λ$_l$ and λ$_r$, either side of the λ$_B$.

Figure 7B:
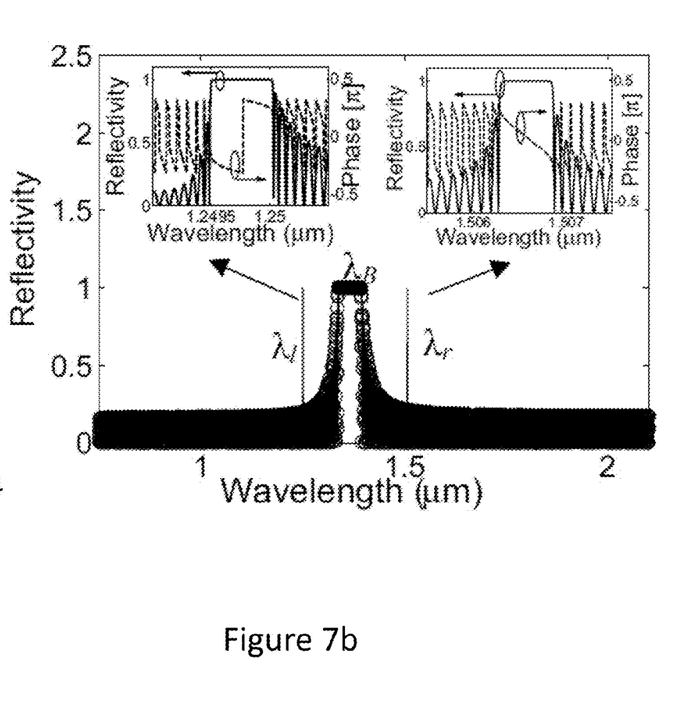
FIG. 7b is a reflectivity spectrum for an all-optical wavelength converter.

FIG. 7b shows reflectivity spectra both for the perturbed and unperturbed Bragg grating 102, calculated using the transfer matrix method (TMM) and assuming the total number of periods of the unperturbed Bragg grating to be N=12000. It can again be seen that dual ARPs occur at either side of the main reflective peak of the Bragg grating. The centre wavelengths of the dual ARPs are λ$_l$=1249.7 nm and λ$_r$=1506.5 nm, respectively, which agrees well with the dispersion diagram. The insets of FIG. 7b show the reflectivity and phase spectra of the dual ARPs, indicating that the induced ARPs have a full-width at half-maximum (FWHM) as narrow as ~0.2 nm.

Figure 7C:
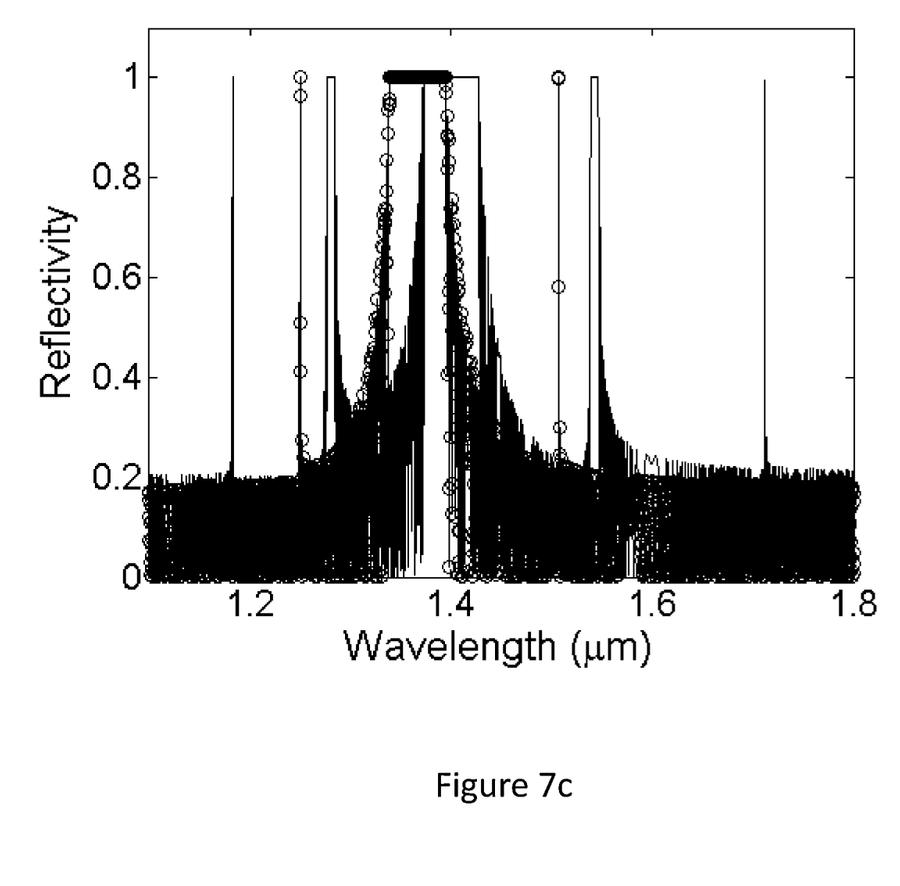
FIG. 7c is a reflectivity spectrum for an all-optical wavelength converter.

It is noted that dispersion diagram of FIG. 7a indicates that the perturbed Bragg grating 102 should have multiple ARPs according, but as shown in FIG. 7b there are only dual ARPs (at wavelengths above and below λ$_B$). The reason for this is that the amplitude of the induced refractive index change Δn(z) is not large enough. When the amplitude of Δn(z) is enlarged to n$_{c,d}$=2.5×10$^{-2}$, more ARPs are excited as depicted in FIG. 7c. It is also noted that each band gap experiences a red-shift, which can be explained because a larger effective refractive index $n_{\mathit{eff}}$ is induced.

EXAMPLE 6

Effect of Refractive Index Step and Length of the Bragg Grating

Figure 8A:
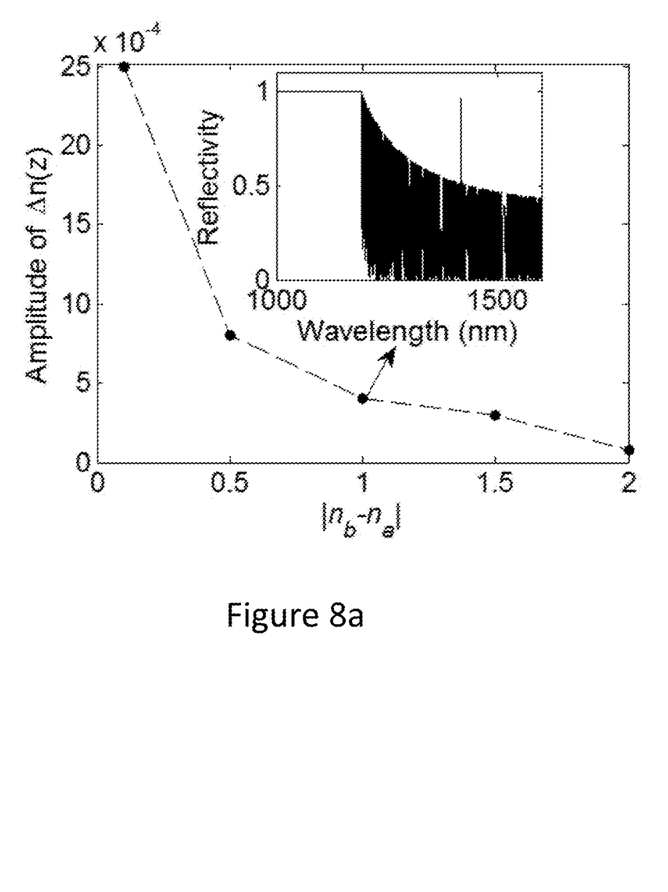
FIG. 8a is a plot showing how the amplitude of the induced refractive index change Δn(z), required to form ARPs, varies with the refractive index strep in the Bragg grating.

FIG. 8a is a plot of how the refractive index difference $|n_b-n_a|$, between the low refractive index portions 102a and high refractive index portions 102b of the Bragg grating 102, influence the amplitude of the refractive index change, $\Delta n(z)$, required to generate or enhance the ARPs. The inset of FIG. 8a is a plot of a reflectivity spectrum of an additional reflective peak of a Bragg grating 102 with a refractive index difference $|n_b-n_a|=1$. These figures are plotted for an input signal of 100 mW of optical power and a pump source 108 of 100 mW of optical power each being directed into modal area $A=0.6\times10^{-13}$ m$^2$ in a silicon Bragg grating 102. FIG. 8a shows that increasing the refractive index difference in the Bragg grating 102 reduces the refractive index modulation $\Delta n(z)$ required to form the APRs, and hence reduces the optical power required from the input signal 104 and the pump source 108 to form the ARPs. However, the inset of FIG. 8a shows that, with a relatively low power pump source 108 (100 mW), a highly reflective ARP can be formed with an refractive index modulation $\Delta n(z)$ as low as $10^{-5}$–$10^{-4}$.

Figure 8B:
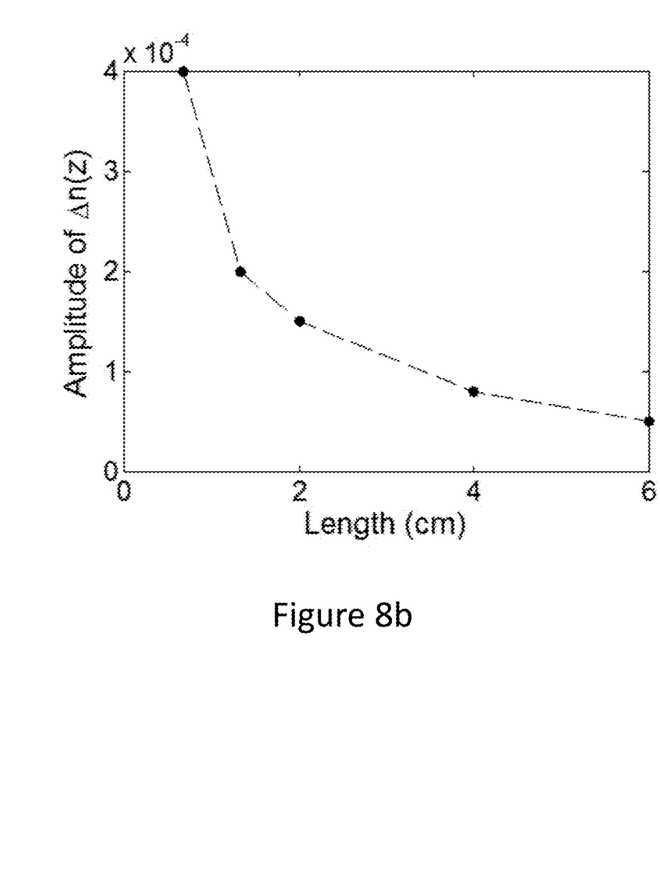
FIG. 8b is a plot showing how the amplitude of the induced refractive index change Δn(z), required to form ARPs, varies with the length of the Bragg grating.

FIG. 8b is a plot showing how the amplitude of the induced refractive index change $\Delta n(z)$, required to form ARPs, varies with the length of the Bragg grating 102 (that is, number of periods in the Bragg grating 102). FIG. 8b is also plotted for an input signal of 100 mW of optical power and a pump source 108 of 100 mW of optical power each being directed into modal area $A=0.6\times10^{-13}$ m$^2$ in a silicon Bragg grating 102. As can be seen from FIG. 8b, increasing the length of the Bragg grating 102 decreases the refractive index modulation $\Delta n(z)$ required to form and ARP of a given reflectivity value, and hence reduces the optical power required from the input signal 104 and the pump source 108 to form the ARPs.
Further Embodiments and Applications In some embodiments, the phase of the light from the pump source 108 is modified so as to provide phase compensation (such as dispersion compensation or group delay compensation) to reduce chromatic dispersion of optical elements such as those used in mode-locked lasers and in telecommunications systems; this can be done because the phase of the input optical signal 104 is replicated in the phase of the ARP (Bessel sideband). This may be done by applying phase changes to a tuneable laser in the pump source 108 via a phase modulator, such as a lithium niobate modulator, or by passing the light from the pump source 108 through one or more dispersion lines, such as resonant cavities, or in-fibre dispersive elements. Dynamic changes may be created by tuning the resonant cavities (with temperature or piezoelectric effects using lithium niobate etc., for example) or, in the case of in-fibre elements, by switching.

It can be seen from the foregoing description that a input signal 104 with small signal amplitude can, when combined with a stronger intensity pump source 108 (such as a tuneable laser), create a modulated perturbation of the refractive index of a non-linear material that despite being small, is large enough to form a Bessel sideband (an ARP) on which a much stronger probe source 110 comprising laser light may be reflected to form an output signal 106 (that is much stronger in intensity than the input signal 104). Since this reflected output signal 106 only exists when light from both the input signal 104 and the pump source 108 are received (and under the correct wavelength conditions), this function could form the basis of an optical transistor in which an input signal 106 is amplified and the phase information is maintained. In such applications, where the wavelengths of the input signal 104, the output signal 106, and the pump source 108 are well defined, the pump and probe sources 108, 110 need not be tuneable, provided that the converter 100 is designed such that at least one of the generated ARPs corresponds in wavelength to the wavelength of the output signal 106. Although the method and device described above relates to conversion of an input signal 104 at one wavelength to an output signal 106 at a different wavelength, it will be understood that in some applications the wavelength of the input signal 104 can be substantially equal to the wavelength of the output signal 106.

In some embodiments, the Bragg grating 102 may form part of a larger structure, such as an epitaxial structure, that includes other active components. For example, DFB or DBR lasers may be formed in the same structure as the Bragg grating that is used for all-optical wavelength conversion. A DFB or DBR laser may provide the functions of the pump and/or probe sources 108, 110, for example. In some embodiments, the DFB or DBR laser(s) may be tuneable or may be arranged to lase at a number of wavelengths, or comb frequencies. In such embodiments, DFB or DBR lasers may be used as both the pump and probe sources 108, 110.

The above embodiments are to be understood as illustrative examples of the invention. Further embodiments of the invention are envisaged. For example, although the above embodiments are described as including a Bragg grating, photonic structures having periodicity in more than one dimension may be used to perform all-optical wavelength conversion. For example, in some embodiments, 2-D or 3-D photonic crystals may be used instead of the 1-D Bragg grating.

Furthermore, although in the embodiments described above the induced ARP result from a modified refractive index profile of a third-order Kerr non-linear material, it will be understood that any material that provides the required change in refractive index, and the corresponding change in the reflectivity spectrum of the Bragg grating in response to the beating intensity pattern described above, could be used.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A device for converting an input light signal into an output light signal, the device comprising an optical component, said component having a refractive index having a spatial periodicity that determines a reflectivity spectrum of the component,
  wherein the optical component is arranged to:
    receive an input light signal having a first wavelength;
    receive a first light beam, such that the first light signal and the first light beam interfere to form an interference pattern such that the reflectivity spectrum of the component is modified in dependence upon the interference pattern to increase the reflectivity of the component in a portion of the reflectivity spectrum;

receive a second light beam, the second light beam having a second wavelength corresponding with a wavelength within the portion of the reflectivity spectrum; and reflect, from the optical component, in dependence upon the portion of the reflectivity spectrum, the second light beam to generate the output light signal, wherein the second light signal has the second wavelength.

2. A device according to claim 1, wherein the optical component comprises at least two materials arranged alternately such that the refractive index of the component has a spatial periodicity resulting in the optical component having a reflectivity spectrum with at least one reflective peak.

3. A device according to claim 1, wherein the optical component comprises one or more optical couplings arranged to couple light into and/or out of the component.

4. A device according to claim 1, wherein the first light beam is received from a first light source and the second light beam is received from a second light source.

5. A device according to claim 4, comprising the first and second sources.

6. A device according to claim 4, wherein the first light source is different to the second light source.

7. A device according to claim 4, wherein the first and second sources are tuneable.

8. A device according to claim 4, wherein the second source is arranged to provide light at a polarisation substantially perpendicular to a polarisation of light provided by the first source.

9. A device according to claim 4, wherein at least one of the first and second sources comprises a DFB laser.

10. A device according to claim 1, wherein the optical component comprises a Bragg grating.

11. A device according to claim 10, wherein at least a portion of the Bragg grating comprises a material having a refractive that has a non-linear response to electromagnetic radiation.

12. A device according to claim 1, comprising an input data source.

13. An optical transistor comprising a device according to claim 1.

* * * * *